(12) United States Patent
Liu et al.

(10) Patent No.: US 11,104,795 B2
(45) Date of Patent: Aug. 31, 2021

(54) COMPOSITION OF REINFORCED POLYALKYLENE TEREPHTHALATE, PREPARATION AND USE THEREOF

(71) Applicant: BASF SE, Ludwigshafen (DE)

(72) Inventors: Zhenguo Liu, Shanghai (CN); Dai Watanabe, Shanghai (CN); Hui Wang, Beijing (CN); Simon Kniesel, Weinheim (DE)

(73) Assignee: BASF SE, Ludwigshafen (DE)

( * ) Notice: Subject to any disclaimer, the term of this patent is extended or adjusted under 35 U.S.C. 154(b) by 562 days.

(21) Appl. No.: 14/780,569

(22) PCT Filed: Mar. 26, 2014

(86) PCT No.: PCT/EP2014/056024
§ 371 (c)(1),
(2) Date: Sep. 28, 2015

(87) PCT Pub. No.: WO2014/154731
PCT Pub. Date: Oct. 2, 2014

(65) Prior Publication Data
US 2016/0060452 A1 Mar. 3, 2016

(30) Foreign Application Priority Data

Mar. 29, 2013 (WO) ................ PCT/CN2013/073479

(51) Int. Cl.
*C08L 67/02* (2006.01)
*C08L 67/03* (2006.01)
(Continued)

(52) U.S. Cl.
CPC .......... *C08L 67/03* (2013.01); *B29C 45/0001* (2013.01); *B29C 48/022* (2019.02);
(Continued)

(58) Field of Classification Search
CPC .......... C08L 67/02; C08L 23/08; C08L 69/00; C08L 83/04; C08L 67/03; C08J 2467/03;
(Continued)

(56) References Cited

U.S. PATENT DOCUMENTS 6,660,789 B2  12/2003  Uno et al.
7,507,474 B2   3/2009  Varlet et al.
(Continued)

FOREIGN PATENT DOCUMENTS

DE    10211513 A1   10/2002
EP     2431152 A2    3/2012
(Continued)

OTHER PUBLICATIONS

International Search Report and Written Opinion, International Application No. PCT/EP2014/056024, dated Sep. 18, 2014.
(Continued)

*Primary Examiner* — Ellen S Hock
(74) *Attorney, Agent, or Firm* — Marshall, Gerstein & Borun LLP (57) ABSTRACT

A composition comprises polyalkylene terephthalate and terpolymer of alkylene diol, isophthalic acid and terephthalic acid, and polyalkylene terephthalate reinforcing fiber. The composition may be used to form an article, alone or with other thermoplastic material, at lower processing temperature, with higher melt flowability. The article formed is characterized with lower warpage and improved mechanical properties. The article may be useful for automotive, electrical, household, construction, and industrial applications. A method of preparing such thermoplastic polyester is also disclosed.

7 Claims, 4 Drawing Sheets

(51) Int. Cl.
  *B29C 48/00* (2019.01)
  *C08K 7/14* (2006.01)
  *B29C 45/00* (2006.01)
  *B29C 49/00* (2006.01)
  *C08J 5/04* (2006.01)
  *C08L 27/06* (2006.01)
  *B29K 23/00* (2006.01)
  *B29K 27/06* (2006.01)
  *B29K 67/00* (2006.01)
  *B29L 31/00* (2006.01)

(52) U.S. Cl.
  CPC ........... *B29C 49/0005* (2013.01); *C08J 5/043* (2013.01); *C08K 7/14* (2013.01); *C08L 27/06* (2013.01); *C08L 67/02* (2013.01); *B29K 2023/00* (2013.01); *B29K 2027/06* (2013.01); *B29K 2067/00* (2013.01); *B29L 2031/00* (2013.01); *C08J 2367/03* (2013.01); *C08J 2467/03* (2013.01)

(58) Field of Classification Search
  CPC ... C08J 2367/03; C08J 5/043; B29K 2023/00; B29C 49/0005; B29C 45/0001
  USPC ........................................................ 428/35.7
  See application file for complete search history.

(56) References Cited

U.S. PATENT DOCUMENTS

2006/0142423 A1  6/2006  Takayama et al.
2010/0319843 A1  12/2010  Wust et al.

FOREIGN PATENT DOCUMENTS

JP      H04178425 A    6/1992
RU      2318007 C2     2/2008

OTHER PUBLICATIONS

International Preliminary Report on Patentability, International Application No. PCT/EP2014/056024, dated Mar. 3, 2015.

COMPOSITION OF REINFORCED POLYALKYLENE TEREPHTHALATE, PREPARATION AND USE THEREOF

CROSS-REFERENCE TO RELATED APPLICATIONS

This is the U.S. national phase of PCT/EP2014/056024, filed Mar. 26, 2014, which claims the benefit of PCT/CN2013/073479, filed Mar. 29, 2013.

The present invention is directed to a composition of modified reinforced polyalkylene terephthalate, which has superior processability such as lower processing temperature and higher melt flowability, as well as better material performance such as lower warpage when forming a shaped article together with another thermoplastic material, and higher mechanical properties. The present invention is also directed to the preparation and use of said composition.

Thermoplastic polyester, i.e., polyalkylene terephthalate (PAT), such as polybutylene terephthalate (PBT) and polyethylene terephthalate (PET), is commonly reinforced by PAT-reinforcing fiber, such as glass fiber (GF), and is commercially available. PAT is typically formed into an article utilizing melt forming technique such as extrusion, blow molding or injection molding. A lower processing temperature makes PAT easier to process because PAT melt flows faster. As processing temperature is dictated by melting point, the parameter to watch in searching of lower processing temperature is mostly melting point of the PAT. On the other hand, it is apparent that increasing melt flowability will be beneficial if the melt flowability can be increased via modification. Therefore the low processing temperature (or melting point) and/or higher melt flowability also decreases cycle-time for making the articles.

In recent years, GF reinforced PBT has been used to replace steel in extruded polyvinyl chloride (PVC) profile as a reinforced material. In US2010/0319843A1, PBT strip and PVC profile are produced separately and the PBT strip is inserted into PVC profiles to reinforce the PVC profiles as replacement of metal insert. However, with increased GF content, the GF-reinforced PAT suffers from poor processability and performance, such as high warpage, high processing temperature, and low melt flowability. It is essential to improve the low warpage and processability for GF reinforced PAT to be used in many injection molding, blow molding and extrusion applications.

When the GF-reinforced PAT is used to form composite structure with other thermoplastic material, application of GF-reinforced PAT is also limited by the high processing temperature of PAT. For example, in EP2431152A2, GF filled PBT is co-extruded with PVC to produce co-extruded PVC profile. However, glass filled PBT's melting point (and thus processing temperature) is too high. The melt PBT material caused color change, degradation, and poor adhesion to the PVC profile with poor overall performances.

Therefore, there is a need to find a way to produce reinforced PAT with high GF content and lower processing temperature, lower warpage, higher flowability, and/or better mechanical properties.

In JP41784725A, terpolymer of ethylene glycol, isophthalic acid and terephthalic acid (PEIT) and PBT is blended to obtain low melting point PBT. However, JP41784725A did not disclose the use of GF to reinforce PAT. In fact, the PEIT modified PBT of the application was targeted to improve thermal bonding of textile layers in fiber industry. There is no need to incorporate glass fiber for such composition or application. In addition, melting point of the PEIT-modified PBT is still too high to be used for, for example, forming composite structure with PVC.

Thus, an objective of the present invention is to provide a composition comprising PAT, more specifically PBT or PET, which is reinforced by PAT-reinforcing fiber, more specifically GF, and is modified by a terpolymer of a alkylene diol, isophthalic acid and terephthalic acid (PAIT), more specifically PEIT, so that the product has superior processing properties such as lower processing temperature, higher flow, better mechanical properties, and lower warpage.

Another objective of the present invention is to provide a process for the production of said composition.

A further objective of the present invention is to provide the use of said composition to form shaped article, either alone or with other thermoplastic materials, by melt forming such as blow molding, injection or co-extrusion.

A final objective of the present invention is to provide a shaped article using said composition. The objects are achieved by a composition comprising i) polyalkylene terephthalate, ii) (polyalkylene isophthalate)-co-(polyalkylene terephthalate), iii) polyalkylene terephthalate-reinforcing fiber, and iv) optionally, one or more additives, wherein the alkylenes in component i) is selected from the group consisting of methylene group, ethylene group, propylene group, butylene group and cyclohexene dimethylene group, and the alkylene in component ii) is selected from the group consisting of methylene, ethylene, propylene and butylene and a process for its production, wherein the components i) to iii) and optionally iv), or precursor of any of the components thereof, are compounded under the condition that component i) and ii) can be melt processed, the use of the composition, wherein the composition is melt formed, optionally together with one or more additional thermoplastic material, to form shaped article. The object is furthermore achieved by a process to modify a first thermoplastic material with a second thermoplastic material, wherein the second thermoplastic material is melt formed together with the first thermoplastic material, wherein the melting point of the modified first thermoplastic material is reduced, and by the use of the modified first thermoplastic material produced by the process, wherein the modified first thermoplastic material is melt formed, optionally together with an additional third thermoplastic material.

It was found that by blending PAT, more specifically PBT or PET, with PAIT, more specifically PEIT, and PAT-reinforcing fiber, more specifically GF, the objectives of the present invention can be achieved. The so-produced PAIT-modified fiber-reinforced PAT has superior processability such as higher melt flowability of the melt and lowered melting point (and thus lower processing temperature), and has lower warpage of the product when being used to form shaped article together with other thermoplastic material, such as PVC. The PAIT-modified fiber-reinforced PAT can be formed into shaped body alone or in combination with other thermoplastics, such as PVC, by forming composite structure.

The composition comprising PAT, PAIT and PAT-reinforcing fiber can be preferably obtained by compounding PAT, PAIT and the PAT-reinforcing fiber.

In an embodiment of the invention, PAT is a thermoplastic copolymer of an alkylene diol and an alkylene terephthalate. Preferably, the PAT is selected from the group consisting of polymethylene terephthalate, polyethylene terephthalate, polypropylene terephthalate, polybutylene terephthalate and polycyclohexene dimethylene terephthalate. Most preferably, the PAT is selected from PET and PBT. It can be appreciated by those skilled in the art that mixtures of PAT can also be used.

Suitable specification of the PAT, such as molecular weight, and the content of the PAT in the composition, can be determined by those skilled in the art by conventional means in order to achieve desirable mechanical property and processability.

In an embodiment of the invention, PAIT is a thermoplastic terpolymer of an alkylene diol, isophthalic acid and terephthalic acid. Preferably, the PAIT is selected from the group consisting of polymethylene terephthalate-co-polymethylene isophthalate, polyethylene terephthalate-co-polyethylene isophthalate, polypropylene terephthalate-co-polypropylene isophthalate and polybutylene terephthalate-co-polybutylene isophthalate. The copolymer can be of any architecture, such as that of random, alternating or block copolymer. Most preferably, the PAT is selected from PEIT and PBIT. It can be appreciated by those skilled in the art that mixtures of PAIT can also be used.

Suitable specification of the PAIT, such as molecular weight, molar ratio of terephthalate units and the isophthalate units, and content of the PAIT in the composition, can be determined by those skilled in the art by conventional means in order to achieve desirable mechanical property and processability. It should be noticed that the content of isophthalate unit in PAIT is preferably higher than zero, more preferably 5 to 50%, even more preferably 10 to 40%, most preferably 15 to 25%, by mole based on the total number of isophthalate unit and terephthalate unit in the PAIT.

In an embodiment of the inversion, PAT-reinforcing fiber is any fibrous material that can be used to reinforce PAT. Preferably, the PAT-reinforcing fiber is selected from the group consisting of glass fibers, polyamide fibers, cellulose fibers, and ceramic fibers, however, it is can be appreciated by those skilled in the art that the fiber is mot limited to these. Most preferably, the PAT-reinforcing fiber is GF. It can also be appreciated that various combinations and mixtures of the above PAT-reinforcing fibers may be used.

More preferred PAT-reinforcing fibers are those comprising functional structures such as epoxy groups for reacting with the carboxyl groups of the PAT to create ether linkages. The reaction between the functional structures and the PAT or the intermediate compound may also ensure that the fiber has good adhesion thereby improving the physical properties of the article formed there-from. The functional structures are preferably a polyurethane structure, and, more preferably, a reaction product of bis(cyclohexylisocyanato) methane, 1,6-hexanediol and adipic acid polyester, and bisphenol glycidyl ether.

Suitable specification of the PAT-reinforcing fiber and content of the fiber in the composition can be determined by those skilled in the art by conventional means in order to achieve desirable mechanical property and processability.

It can be appreciated by those skilled in the art that the composition may further comprise other known additives.

For example, in an embodiment of the invention, the composition may further include one or more lubricant. If included, the lubricant is preferably an ester or amide of saturated aliphatic carboxylic acids having from 10 to 40 carbon atoms and saturated aliphatic alcohols or amines having from 2 to 40 carbon atoms. It is believed that when the lubricant includes fatty acid chains that are highly hydrophobic, the lubricant further aids in the hydrolysis resistance of the composition and the thermoplastic polymer. A preferred lubricant is pentaerythritol tetrastearate. If included, the lubricant is preferably present in an amount of about 0.01 to 5% by weight, more preferably of about 0.01 to 3% by weight, and most preferably of about 0.01 to 2% by weight, each based on the total weight of the composition.

In an embodiment of the invention, the composition may include one or more thermal antioxidant. If included, the thermal antioxidant preferably has a sterically hindered phenolic group. Those skilled in the art appreciate that various thermal antioxidants are available to stabilize the composition and the thermoplastic polymer against discoloring and to prevent thermo-oxidative degradation. In one embodiment, the thermal antioxidant is one or more material selected from the group consisting of pentaerythritoltetrakis (3-(3,5-di-tert-butyl-4-hydroxyphenyl)propionate), tetrakis (methylene-3-(3',5'-di-tert-butyl-4'-hydroxyphenyl) propionate) methane, octadecyl-3-(3',5'-di-tert-butyl-4'-hydroxyphenyl)propionate, 1,3,5-trimethyl-2,4,6-tris(3,5-di-tert-butyl-4-hydroxybenzyl)benzene, and 4,4'-(2,2-diphenylpropyl)diphenylamine. It is also to be appreciated by those skilled in the art that various combination and mixtures of the above thermal antioxidants may also be utilized with the present invention. The preferred thermal antioxidant is pentaerythritol tetrakis(3-(3,5-di-tert-butyl-4-hydroxyphenyl)propionate). If included, the thermal antioxidant is preferably present in an amount of 0.01 to 5% by weight, more preferably of 0.01 to 3% by weight, and most preferably of 0.01 to 1.5% by weight, each based the total weight of the composition.

In an embodiment of the invention, the composition may include one or more nucleating agents. If included, the nucleating agent is preferably selected from at least one of, but not limited to, talc, kaolin, mica, sodium carbonate, calcium sulfate, and barium sulfate. It is to be appreciated by those skilled in the art that various combination and mixtures of the above nucleating agents may also be utilized with the present invention. If included, the nucleating agent is preferably present in an amount of about 0.01 to 2% by weight, more preferably of about 0.01 to 1% by weight, and most preferably of about 0.01 to 0.1% by weight, each based on the total weight of the composition.

In an embodiment of the invention, the composition may include one or more pigments. If included, the pigment may include inorganic or organic compounds and may impart a special effect and/or color to the article. The pigment may also be dispersed in a carrier matrix, such as a plastic resin, as understood by those of ordinary skill in the art. In one embodiment, the pigment is carbon black pigment. It is to be appreciated by those skilled in the art that the pigment may be any one of or combination of pigments known in the art. If included, the pigment is present in an amount of about 0.05 to 5% by weight, more preferably of about 0.5 to 3% by weight, and most preferably of about 0.5 to 1.5% by weight, each based on the total weight of the composition. The amount of the pigment includes the amount of the carrier matrix, if any. If the carrier matrix is employed, the pigment is preferably present in an amount of 10 to 50% by weight based on the total weight of the pigment and carrier matrix.

In an embodiment of the invention, PAT, PAIT and PAT-reinforcing fiber and optional additives are compounded in conventional means to form the PAIT-modified fiber-reinforced PAT composition as described above. The method of preparing the composition preferably comprises the steps of providing the PAT, the PAIT, and the PAT-reinforcing fiber, along with other optional components as described above; and the step of compounding of the components, which is usually conducted at a temperature of between about 150 to 350° C. It is to be appreciated by those skilled in the art that these steps may also be conducted at lower or higher temperatures. The method of the present invention may be conducted in an apparatus selected from the group consisting of compounders, single-screw extruders, twin-screw extruders, ring extruders, mixers, and reaction vessels an alike. The preferred apparatus is a twin-screw extruder. Those of ordinary skill in the art will be able to appreciate that other apparatuses may be used.

Without wishing to be limited to a certain theory or mechanism, it is believed that transesterification occurred during compounding process to form a copolymer in order to achieve a better performance, such as lower melting point, higher melt flowability, and lower warpage.

The PAIT-modified fiber-reinforced PAT may then be heated and molded into the article, preferably via extrusion processes, blow molding or injection molding processes. It is to be appreciated by those skilled in the art that the present invention is not limited to one particular method of making the article. Alternatively, the composition can also be then used to reinforce other thermoplastic materials, preferably PVC, in conventional means, such as co-extrusion, to form a composite structure.

The present invention will be illustrated with PBT as the thermoplastic PAT, PEIT as PAIT, and GF as PAT-reinforcing fiber, to form a composition with lower melting point, higher melt flowability, and lower warpage of the molded or extruded article when being used to form the article together with other thermoplastic material, such as PVC, compared with GF-reinforced PBT. However, those skilled in the art will be able to appreciate that the present invention is not limited to such materials.

PBT is commercially available material and is used as received without further treatment. Typical melting point of the PBT is about 225° C. Preferably, the PBT is characterized by viscosity number of 80 to 170, more preferably 100 to 150. The content of PBT is preferably 15 to 75%, more preferably 20 to 50% by weight based on the total weight of the composition.

PEIT is commercially available material and is used as received without further treatment. Typical melting point of the PEIT is about 100 to 200° C. Preferably, the PEIT is characterized by melting point of 110 to 180° C. The content of PEIT is preferably 15 to 75%, more preferably 20 to 50%, by weight based on the total weight of the composition. Higher PEIT content will result in lower melting point and thus lower processing point.

GF is commercially available material and is used as received without further treatment. The content of the GF is preferably 5 to 60%, more preferably 10 to 55%, by weight based on the total weight of the composition.

A typical process of preparing the composition includes dry blending the components followed by pelletizing to form pellets. The pellets are then extruded to form the pellets. It is to be appreciated by those skilled in the art that other processes may also be used.

The composition of PEIT-modified GF-reinforced PAT composition can be heated and molded into shaped articles, preferably via extrusion processes, blow molding or injection molding processes. It is to be appreciated by those skilled in the art that the present invention is not limited to one particular method of making the article.

Alternatively, the composition can also be then used to reinforce other thermoplastic materials, preferably PVC, in conventional means, such as co-extrusion to forma a composite structure. Co-extrusion of PVC and PBT is an easy process for the production of PVC/PBT composite structure. However, there is a technical obstacle for PVC/PBT co-extrusion because of significantly different melting points between PVC and PBT, around 200 and 225° C., respectively. Due to this fact, the extrusion is performed at elevated temperature up to 230 to 240° C. In this area of temperature, PVC already started to show severe thermal degradation and it becomes impossible to obtain the desired product. With the present invention, modified reinforced PBT can have a lowered melting point of around 200° C. while maintaining other key and ancillary properties. This makes it possible to co-extrude PVC and PBT in conventional manner.

In order to co-extrude PVC and PBT, melting point of PBT is adjusted by controlling the content of PEIT to a specific value within the range of content of PEIT defined above, so that a desirable melting point of modified reinforced PBT can be obtained, in order to avoid color change, deformation, warpage, and degradation of PVC upon co-extrusion. The higher PEIT content is, the lower the melting point of PEIT-modified GF-reinforced PBT will be.

It is apparent for those skilled in the art that PBT can be replaced with PET or other PAT such as polycyclohexane dimethylene terephthalate, and/or PEIT is replaced with terpolymer of propylene glycol, isophthalic acid and terephthalic acid, or terpolymer of butylene glycol, isophthalic acid and terephthalic acid. It is also apparent for those skilled in the art that, in such cases, the present invention can be implemented in a manner that is similar to the process for PBT and PEIT.

By modifying PAT with PAIT and reinforcing PAT with PAT-reinforcing fiber, PAT with superior processability such as lower processing temperature and higher melt flowability, as well as better material performance such as lower warpage of the produced article when being used together with other thermoplastic material and higher mechanical properties can be achieved. With such PAT, it is possible to obtain, by conventional means, alone or together with other thermoplastic material, shaped article with better appearance or mechanical performance.

The present invention will be illustrated by the examples below.

EXAMPLE I

Production of PEIT-Modified GF-Reinforced PBT

PEIT-modified GF-reinforced PBT is produced by compounding the composition according to Table I in a conventional twin screw extruder using the standard PBT extrusion conditions, which is listed below in Table II.

TABLE I

|  |  | Ex-1 | Ex-2 | Ex-3 | Ex-4 |
|---|---|---|---|---|---|
| Ultradur B4500 NAT, wt % | PBT | 43.40 | 25.40 | 21.70 | 21.70 |
| Loxiol P861/3.5, wt % | Lubricant | 0.15 | 0.15 | 0.15 | 0.15 |
| Sodium Carbonate IPH, wt % | Nucleating agent | 0.25 | 0.25 | 0.25 | 0.25 |
| Printex 60A, wt % | Carbon black pigment | 1.20 | 1.20 | 1.20 | 1.20 |
| Low melt point polyester Chip (Type III) (m.p. 180° C.), wt % | PEIT |  | 18.00 | 21.70 |  |

TABLE I-continued

|  |  | Ex-1 | Ex-2 | Ex-3 | Ex-4 |
|---|---|---|---|---|---|
| Low melt point polyester Chip (Type I) (m.p. 130° C.), wt % | PEIT |  |  |  | 21.70 |
| NEG T-187H, wt % | GF | 55.00 | 55.00 | 55.00 | 55.00 |

TABLE II

| TZ1 (° C.) | TZ2 (° C.) | TZ3 (° C.) | TZ4 (° C.) | TZ5 (° C.) | TZ6 (° C.) | TZ7 (° C.) | TZ8 (° C.) | TZ9 (° C.) | TZ12 (° C.) | TZ13 (° C.) | Screw (rpm) |
|---|---|---|---|---|---|---|---|---|---|---|---|
| 55 | 260 | 260 | 240 | 240 | 240 | 240 | 270 | 270 | 270 | 270 | 400 to 500 |

EXAMPLE II

Mechanical Properties of PEIT-Modified GF-Reinforced PBT

Mechanical properties are measured by standard processes. MVR is measured according to ISO 1133. Tensile strain at break, tensile strength at break, tensile modulus are measured according to ISO 527. Charpy impact is measured according to ISO 179. Melting point and crystallization point are determined by DSC. The respective result is shown in the Table III.

TABLE III

| Properties | Units | Ex-1 | Ex-3 | Ex-4 |
|---|---|---|---|---|
| MVR (275° C./2.16 kg) | cm³/10 min | 1.674 | 5.32 | 6.83 |
| Tensile Strain at break | % | 1.1 | 1.1 | 1.0 |
| Tensile Strength at break | MPa | 138 | 152 | 146.0 |
| Tensile Modulus | MPa | 18800 | 21000 | 21000.0 |
| Charpy Impact - notched | KJ/m2 | 8.4 | 11 | 11.0 |
| Charpy Impact - un-notched | KJ/m2 | 40 | 43 | 37.0 |
| Melting Point | ° C. | 220.1 | 203 | 182.5 |
| Crystallization Point | ° C. | 201.1 | 183.5 | 167.3 |

Clearly, by PEIT-modification (Ex-2 to Ex-4), mechanical properties like tensile strain at break, Tensile modulus, MVR (flowability), Charpy impact strength can be improved as compared with GF-reinforced PBT (Ex-1).

EXAMPLE III

Melting Point of PEIT-Modified GF-Reinforced PBT

Figure 1:
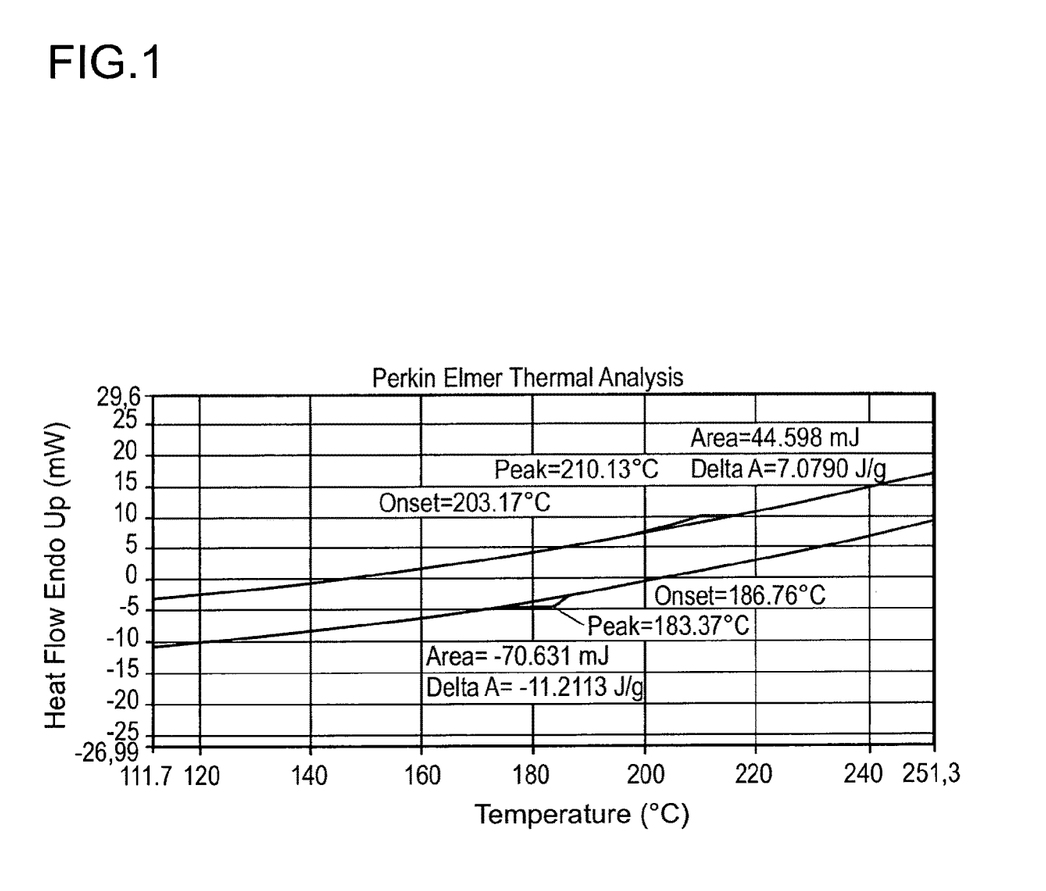
FIGS. 1 to 3 are DSC of PEIT-modified GF-reinforced PBT in Example III.
Figure 2:
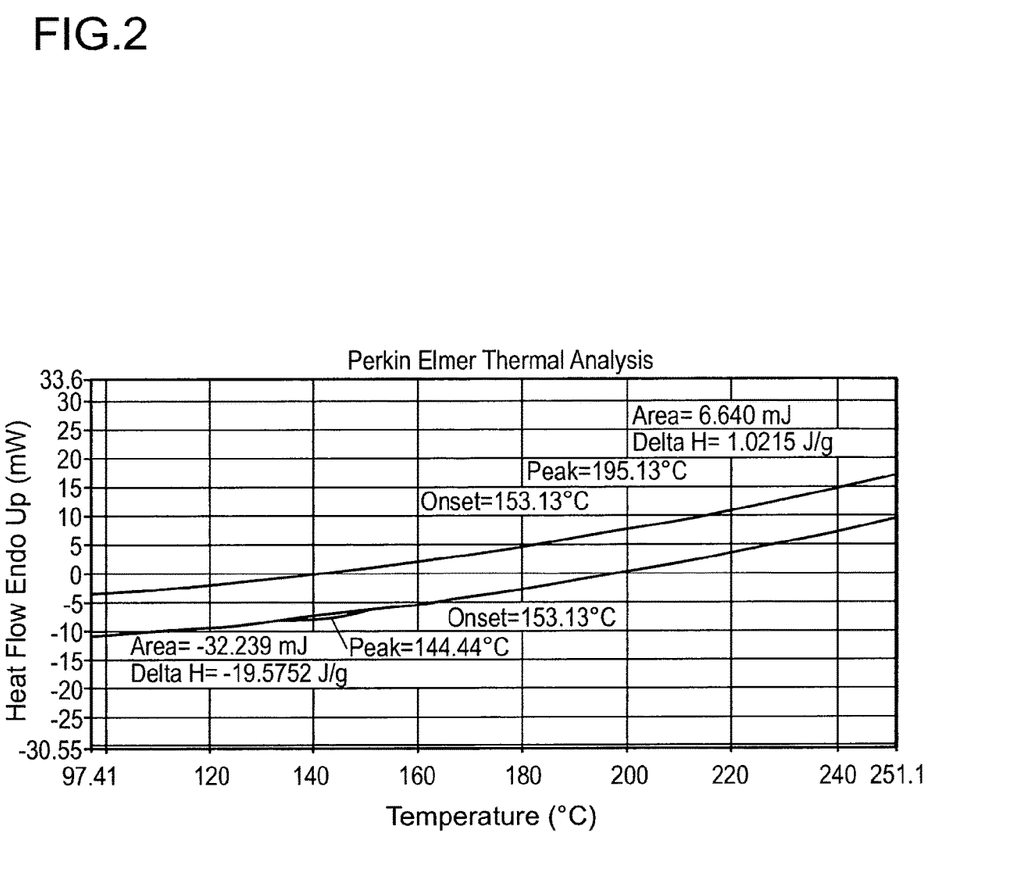
Figure 3:
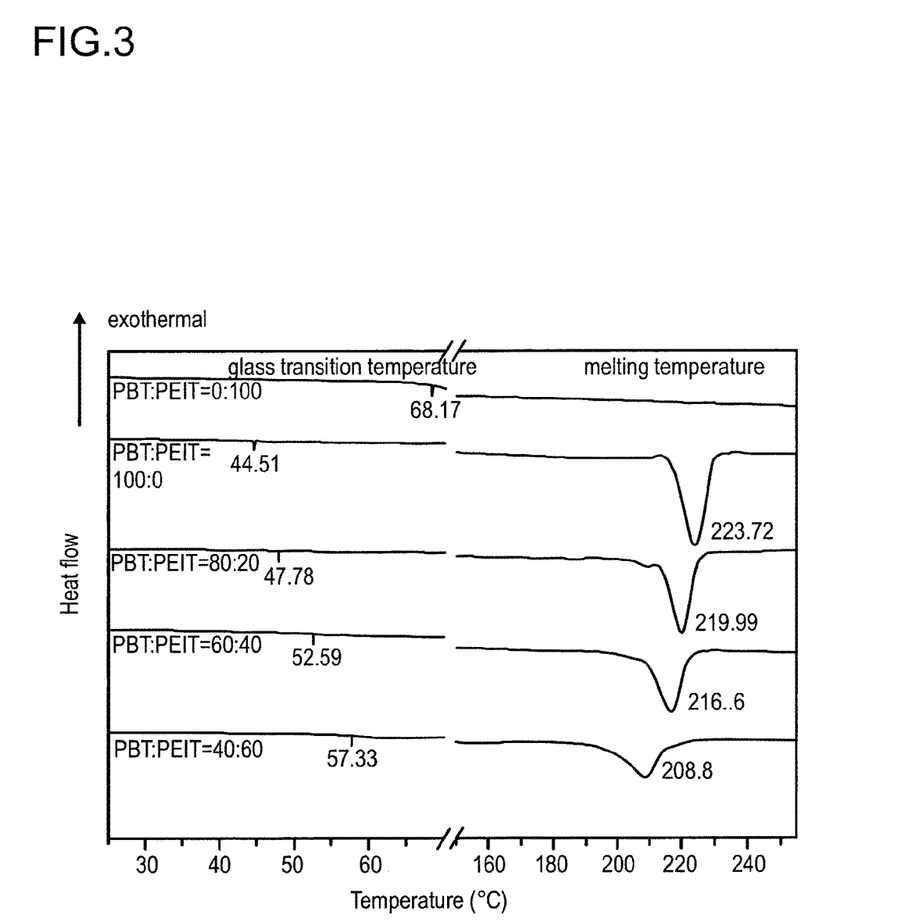

Melting point of PBT is determined with DSC and is shown in FIGS. 1 to 3.

FIG. 1 and FIG. 2 shows DSC result of Ex-2 and Ex-3. Determined melting point and crystallization temperature is listed in Table IV.

TABLE IV

|  | FIG. 1 (Ex-2) | FIG. 2 (Ex-3) |
|---|---|---|
| Melting point (° C.) | 210.13 | 195.13 |
| Crystallization temperature (° C.) | 183.37 | 144.44 |

It can be seen that with the increase of level of PEIT (18.00 to 21.70% by weight), melting point of PEIT-modified GF-reinforced PBT is reduced from to 210 and 195° C., respectively, from the melting point of PBT (225° C.).

FIG. 3 shows the heating curves obtained by DSC for different blend ratios in another series of experiment with Ultradur B2550 used as PBT, replacing Ultradur B4500 NAT in Table I, and PEIT with melting point of 180° C. is used in all the experiments. Note that LMP in FIG. 3 has the same meaning as PEIT. Contents of PBT and PEIT are shown in Table V together with Tg and Tm. It can be seen that with the increase of level of PEIT, melting point of formed PAT is reduced.

TABLE V

| PBT:PEIT* (wt %) | Tg (° C.) | Tm (° C.) |
|---|---|---|
| 100%:0% | 44.51 | 223.72 |
| 80%:20% | 47.78 | 219.99 |
| 60%:40% | 52.59 | 216.6 |
| 40%:60% | 57.33 | 208.8 |
| 0%:100% | 68.17 | — |

*m.p. 180° C.

EXAMPLE IV

PVC Profiles Made of PVC and PEIT-Modified GF-Reinforced PBT

Figure 4:
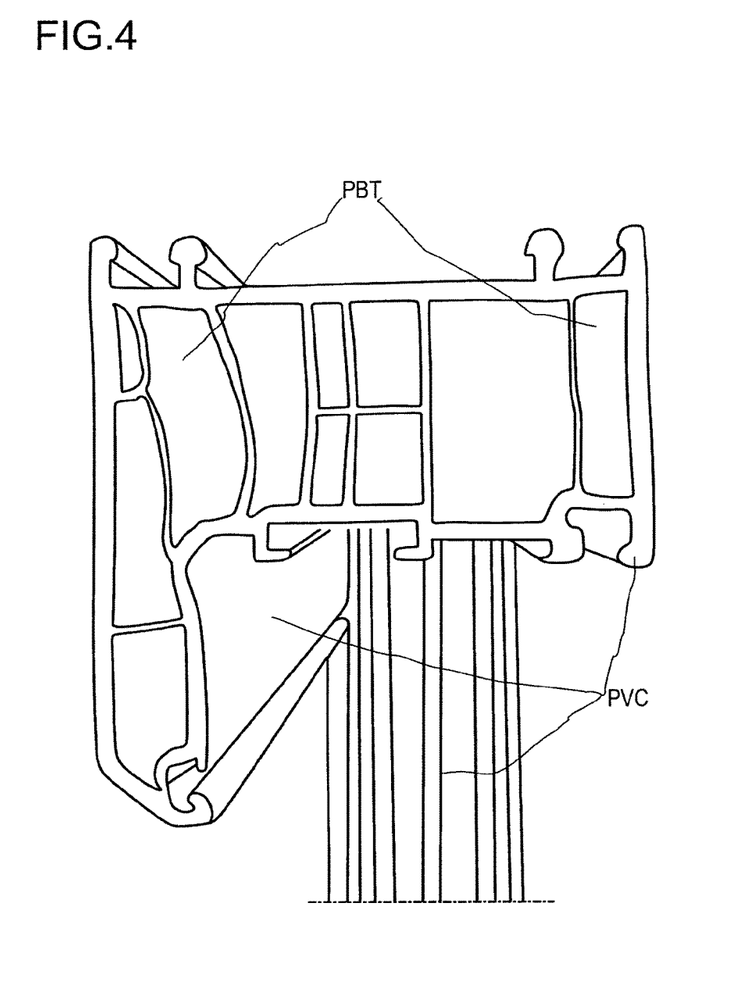
FIG. 4 is a photograph showing a profile formed by co-extruding PVC with GF-reinforced PBT.

PVC profile was made by co-extruding a PVC profile as shown in FIG. 4 with GF-reinforced PBT in Table II (Ex-1) and PEIT-modified GF-reinforced PBT in Table II (Ex-3) at extrusion temperature specified in Table VI.

FIG. 4 is a photograph showing a profile formed by co-extruding PVC with GF-reinforced PBT, in which PBT almost filled the cavity on the left side, while only filled part of the cavity on the right side.

Warpage of the profile is measured according to GB/T 8814-2004, section 6.4.

To determine PBT's filling degree and adhesion to PVC, the profile is ripped apart to expose the PBT part. The exposed PBT part is peeled off from the rest of the profile and weighted. Volume of the PBT filled in the profile is determined from the weight of the PBT part peeled off and specific weight of the PBT. Filling degree is calculated as the percentage of the volume of the designed cavity that PBT filled. Adhesion to PVC roughly determined from the force needed to peel off the PBT from PVC.

Performance of the material is listed in Table VI.

TABLE VI

| Properties | Units | Ex-1 | Ex-3 |
|---|---|---|---|
| Warpage based on 6-m co-extruded profile | mm/m | 4.0 to 5.0 (245° C.) | 0.3 (205° C.) |
| Filling degree at extrusion temperature of 205° C. | % | 0 (can't melt) | 100 |
| Filling degree at extrusion temperature of 215° C. | % | 0 (can't melt) | 100 |

TABLE VI-continued

| Properties | Units | Ex-1 | Ex-3 |
|---|---|---|---|
| Filling degree at extrusion temperature of 245° C. | % | 30 to 40 | 100 |
| Adhesion to PVC (by peeling) | N/A | Poor (245° C.) | Good (205° C.) |

It can be seen that with GF-reinforced PBT, it is not possible to co-extrude with PVC at the temperature of 205 and 215° C. as the PBT is not melting. Only at the temperature of 245° C., can the GF-reinforced PBT be successfully processed. On the other hand, With PEIT modification, the PEIT-modified GF-reinforced PBT can be process at the low temperature of 205° C., the lowered process temperature It can also be seen that, for the produced article, PEIT-modified GF-reinforced PBT such as Ex-3 greatly reduces the warpage of co-extruded PVC profile by 13 to 17 times, filling degree is improved from 30 to 40% to 100% at even lower temperature, and adhesion to PVC is also greatly improved.

It should be appreciated by those skilled in the art that butylene group shall be understood as tetramethylene group.

The invention claimed is:

1. A method of forming a shaped article of a composition consisting of i) a polyalkylene terephthalate, ii) a (polyalkylene isophthalate)-co-(polyalkylene terephthalate), iii) a polyalkylene terephthalate-reinforcing fiber, and iv) optionally, one or more additives selected from the group consisting of lubricants, thermal antioxidants, nucleating agents, pigments, and combinations thereof, wherein the alkylene in component i) is selected from the group consisting of a methylene group, ethylene group, propylene group, butylene group, and cyclohexene dimethylene group, the alkylene in component ii) is selected from the group consisting of methylene, ethylene, propylene, and butylene, and the composition has a melting point in a range from 182° C. to 220° C., the method comprising:
melt-forming the composition together with one or more additional thermoplastic materials to form the shaped article,
wherein at least one of the additional thermoplastic materials is polyvinyl chloride, and
wherein the shaped article has a composite structure between (i) the composition and (ii) the one or more additional thermoplastic materials.

2. The method of claim 1, wherein melt-forming comprises performing blow molding, injection molding, or extrusion.

3. The method of claim 1, wherein the shaped article is tubing, a window profile, a connector, a tank, or an extruded profile part.

4. A shaped article comprising:
(a) a composition consisting of i) a polyalkylene terephthalate, ii) a (polyalkylene isophthalate)-co-(polyalkylene terephthalate), iii) a polyalkylene terephthalate-reinforcing fiber, and iv) optionally, one or more additives selected from the group consisting of lubricants, thermal antioxidants, nucleating agents, pigments, and combinations thereof, wherein
the alkylene in component i) is selected from the group consisting of methylene group, ethylene group, propylene group, butylene group, and cyclohexene dimethylene group,
the alkylene in component ii) is selected from the group consisting of methylene, ethylene, propylene, and butylene, and
the composition has a melting point in a range from 182° C. to 220° C.; and
(b) one or more additional thermoplastic materials, wherein at least one of the additional thermoplastic materials is polyvinyl chloride;
wherein the shaped article has a composite structure between (i) the composition and (ii) the one or more additional thermoplastic materials.

5. The shaped article of claim 4, wherein the shaped article is tubing, a window profile, a connector, a tank, or an extruded profile part.

6. The method of claim 1, wherein the alkylene in component i) is butylene group, the alkylene in component ii) is ethylene, and the polyalkylene terephthalate-reinforcing fiber in component iii) comprises a glass fiber.

7. The shaped article of claim 4, wherein the alkylene in component i) is butylene group, the alkylene in component ii) is ethylene, and the polyalkylene terephthalate-reinforcing fiber in component iii) comprises a glass fiber.

* * * * *